United States Patent Office 3,389,548
Patented June 25, 1968

3,389,548
CORDS
Henri Lachaussee and Gilbert Morieras, Lyon, France, assignors to Societe Rhodiaceta, Paris, France, a French body corporate
No Drawing. Filed Jan. 10, 1966, Ser. No. 519,470
Claims priority, application France, Jan. 13, 1965,
1,774
5 Claims. (Cl. 57—140)

ABSTRACT OF THE DISCLOSURE

Twine, especially for agricultural use, comprises hollow man-made filaments, e.g. of nylons, polyesters or polyolefins, in which the volume of the hollow channel is at least 30% of that of the filament as a whole. Normally the twine will have a denier of 5000 or more, and the individual filaments of 20–120. The twine may contain also solid man-made filaments. The twine has good bulk, a high knotted strength, excellent dynamometric properties, and good resistance to weathering and water.

---

This invention relates to textile structures in the form of ropes, cords or other similar articles hereinafter termed generically "cords," which may be used particularly, but not exclusively, as a twine for agricultural machines.

Twines currently employed in agriculture are generally formed from very long vegetable fibres obtained from agave, such as those commonly known as sisal. These products possess excellent dynamometric characteristics, but also some disadvantages; in particular they undergo considerable degradation under weather influences, in water and from mildew. Moreover, since agave is a plant from hot countries, it is not always readily obtainable, while the demand for twine constantly increases.

Efforts have therefore been made to replace vegetable fibres by chemical yarns. The twines obtained, despite the advantages inherent in the nature of the yarns employed, have scarcely been developed, mainly because they have insufficient bulk, and inadequate knotted strength; also they lack rigidity, and hence are difficult to cut and do not unwind satisfactorily from the ball.

It has also been proposed to produce twines from films of oriented polymeric synthetic material by fibrillation and twisting. The products thus obtained are generally satisfactory, but their method of manufacture renders necessary a fundamental modification of the existing cord-making equipment.

For all these reasons, products intended as substitutes for sisal twines have not been entirely satisfactory. On the other hand, the cords or other similar twisted products of the present invention have properties comparable to those of products based upon vegetable fibres.

The invention comprises cords especially suitable for use as twine for agricultural machines, consisting at least in part of man-made continuous filaments having a continuous internal channel along their length. (The terms "filaments" and "continuous filaments" are to be understood as covering continuous filaments of indefinite length and of restricted length as described below, whenever the context allows).

As will be shown, these products possess many advantages, notably considerable bulk, good knotted strength, excellent dynamometric characteristics and good resistance to weathering and water.

Hollow artificial or synthetic chemical yarns, i.e. yarns comprising a continuous internal channel, are well known per se, and their description and their preparation do not fall within the scope of the present invention. Hitherto, this type of yarn has been used exclusively in the manufacture of woven and/or knitted articles. For example, it has been proposed to produce woven fabrics having little pilling tendency from a mixed yarn of natural fibres (wool or cotton) and hollow polyester fibres. Likewise, for the preparation of tubular articles, such as stockings, it has been proposed to use hollow continuous polyamide filaments. Hitherto, it has not been proposed to use this type of filament in the production of cordage products suitable for use as binding twines, nor have the special advantages attending this use been recognised.

Although it is possible to manufacture agricultural twine and the like according to the invention from hollow filaments of artificial material, for example of viscose or cellulose acetate, filaments of synthetic material are preferred, because they have the advantage of possessing superior dynamometric characteristics for a given weight. Such filaments are, notably, those based upon polyamides, e.g. nylons 6, 6.6 and 11, polyesters, notably of the polyethylene terephthalate type, the polyolefines, such as polypropylene and polyethylene, the polycarbonates, etc. The filaments used are preferably those known to possess good strength and low elongation.

Although it is generally satisfactory to use hollow filaments of circular cross-section, the filaments may also have an irregular cross-section which is non-rounded and/or comprises projections.

Although continuous hollow filaments of indefinite length are preferably employed, it is quite possible to use filaments of limited length namely, filaments having a length of the same order of magnitude as that of the vegetable fibres currently employed in cordage, such as sisal and hemp. Such filaments may be worked on conventional equipment.

For the best results, the void must represent at least 10% of the volume of the filament and preferably at least 30%. (Particularly useful results are obtained by using, for example, hollow filaments having an apparent density in the neighborhood of or below 0.8 in the case of polyethylene terephthalate and 0.6 in the case of polypropylene). It is further advantageous to use unitary filaments whose count is as high as possible, preferably above 10 denier and advantageously between 20 and 100 denier.

As already stated, the products of the invention may consist only partly of hollow filaments, but in such case it is preferable that this type of filament should represent the major proportion, only a minor proportion being formed of solid filaments of identical or different chemical nature.

The articles of the invention can be made by known cordage methods. It is readily possible without any exercise of invention to adapt known equipment to the working of this type of filament.

As will be shown in the examples, the products of the invention possess many advantages over sisal and known sisal substitutes. They have much better resistance to weather influences, water, mildew and other micro-organisms than sisal, and better knotted strength, greater rigidity (which makes them easier to cut) and greater bulk than twines of solid artificial or synthetic filaments.

The following examples illustrate the invention. It will however be understood that hollow filaments of types other than those exemplified can be used in their place.

EXAMPLE 1

There is employed a hollow filament yarn of isotactic polypropylene possessing the following characteristics:

Total count, denier _____ 118
Number of filaments _____ 6
Density of filaments _____ 0.60
Cross-section of filaments _____ Round
Breaking strength, g./denier _____ 6.4
Elongation at break, percent _____ 17.7

|  | Mean diameter in mm. | Weight in g./m. | Number of m./kg. | Breaking load in kg. Dry | Breaking load in kg. Moist | Knotted strength in kg. |
| --- | --- | --- | --- | --- | --- | --- |
| Twine A | 1.50 | 1.4 | 715 | 91.4 | 91.7 | 49.3 |
| Twine B | 2.25 | 1.37 | 730 | 80.3 | 80.4 | 55.6 |

On conventional cordage equipment, 24 ends of this yarn are twisted with 20 S-turns per metre, whereafter three of these twisted yarns are twisted together with 37 Z-turns per metre.

By way of comparison, there are made:

(i) A twine from isotactic polypropylene filaments having a solid circular cross-section, by assembling eight twisted yarns of 760 denier/160 filaments twisted with 40 S-turns per metre, (ii) A sisal twine.

From the table listing the detailed properties of these three articles, it is apparent that the twines according to the invention possess:

(a) As compared with sisal twines, with a substantially equivalent diameter, a much greater length per kilogram, a much higher minimum breaking load, a much more uniform tensile strength, and no loss of strength when wet, (b) As compared with twine made from yarns of chemical filaments of solid circular cross-section, a high apparent volume and good knotted strength with substantially similar dry and moist breaking loads.

|  | Mean diameter in mm. measured under 3% of the breaking load | Weight in g./m. | Number of m./kg. | Dry breaking load in kg.[1] Minimum | Dry breaking load in kg.[1] Mean | Moist breaking load in kg.[2] Minimum | Moist breaking load in kg.[2] Mean | Knotted strength in kg. Minimum | Knotted strength in kg. Mean |
| --- | --- | --- | --- | --- | --- | --- | --- | --- | --- |
| Twine of the invention | 1.90 | 0.93 | 1,077 | 50 | 50.25 | 51.7 | 51.7 | 36 | 39 |
| Twine of solid cylindrical filaments of polypropylene | 1.25 | 0.70 | 1,431 | 49 | 49 | 50 | 50.6 | 27 | 29.4 |
| Sisal twine | About 2 | 2.83 | 353 | 46 | 62 | 46 | 54 | 26 | 34 |

[1] Measurement made at 25° C. and 65% relative humidity.
[2] Measurement made after immersion for 24 hours in water at ambient temperature.

EXAMPLE 2

Two twines for agricultural presses are prepared:

One (A) from a twisted yarn having 70 S-turns per metre and consisting of 12 ends of a 20 filament 1000 denier yarn of solid cylindrical filaments of polyethylene terephthalate having an initial twist of 40 S-turns per metre.

The other (B) from an identical twisted yarn consisting of hollow cylindrical filaments of polyethylene terephthalate having an apparent density of 0.71.

The results set out in the following table show that, despite the fact that twines prepared from solid yarns have higher dry and moist breaking loads, the knotted strength of those of the invention is better, while the loss of strength due to the presence of the knot is much lower.

We claim:

1. Twine, especially for agricultural machines, consisting at least in part of man-made continuous filaments having a continuous internal channel along their length, the said internal channel representing at least 30% of the volume of the filament.

2. Twine according to claim 1, in which the said filaments having an internal channel are present in association with man-made continuous filaments of solid cross-section.

3. Twine according to claim 1, in which the count of the individual man-made continuous filaments having a continuous internal channel along their length, is between 20 and 120 denier.

4. Twine, especially for agricultural machines, consisting at least in part of man-made continuous filaments having a continuous internal channel along their length, the said internal channel representing at least 30% of the volume of the filament, the count of the individual filaments being between 20 and 120 denier, and the count of the said twine being higher than 5,000 denier.

5. Twine according to claim 4, in which the said filaments having an internal channel are present in association with man-made continuous filaments of solid cross-section.

References Cited

UNITED STATES PATENTS

| | | |
| --- | --- | --- |
| 1,464,048 | 8/1923 | Rousset _____ 57—140 XR |
| 1,944,378 | 1/1934 | Thenoz. |
| 2,880,056 | 3/1959 | Carr et al. _____ 161—178 XR |
| 2,965,925 | 12/1960 | Dietzsch _____ 161—178 |
| 2,999,296 | 9/1961 | Breen et al. |
| 3,135,813 | 6/1964 | Holden _____ 161—178 XR |
| 3,160,193 | 12/1964 | Baggett et al. _____ 57—140 XR |
| 3,315,454 | 4/1967 | Carranza _____ 57—140 |

FRANK J. COHEN, *Primary Examiner.*

DONALD WATKINS, *Examiner.*